US006978155B2

(12) United States Patent
Berg

(10) Patent No.: US 6,978,155 B2
(45) **Date of Patent: *Dec. 20, 2005**

(54) FITTING-SETUP FOR HEARING DEVICE

(75) Inventor: Christian Berg, Uerikon (CH)

(73) Assignee: Phonak AG, Stafa (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/877,141

(22) Filed: Jun. 25, 2004

(65) Prior Publication Data

US 2004/0234090 A1 Nov. 25, 2004

Related U.S. Application Data

(63) Continuation of application No. 09/507,088, filed on Feb. 18, 2000, now Pat. No. 6,850,775.

(30) Foreign Application Priority Data

Feb. 18, 2000 (WO) .................... PCT/CH00/00091

(51) Int. Cl.[7] .................... H04Q 7/20
(52) U.S. Cl. .................... 455/557; 455/66.1; 455/556.1
(58) Field of Search .................... 455/556.1, 66.1, 455/418, 419, 420, 557, 92; 381/315, 312, 381/314, 323, 60; 73/585; 600/559

(56) References Cited

U.S. PATENT DOCUMENTS

| | | | | |
|---|---|---|---|---|
| 4,918,736 | A | 4/1990 | Bordewijk | 381/315 |
| 4,918,737 | A | 4/1990 | Luethi | |
| 5,303,306 | A | 4/1994 | Brillhart et al. | |
| 5,610,988 | A | 3/1997 | Miyahara | 381/312 |
| 5,721,783 | A | 2/1998 | Anderson | 381/328 |
| 5,768,397 | A | 6/1998 | Fazio | 29/25.35 |
| 5,824,022 | A | 10/1998 | Zilberman et al. | |
| 5,910,997 | A | 6/1999 | Ishige et al. | 381/314 |
| 6,021,207 | A | 2/2000 | Puthuff et al. | |
| 6,035,050 | A | 3/2000 | Weinfurtner et al. | 381/313 |
| 6,201,875 | B1 | 3/2001 | Davis et al. | 381/314 |

FOREIGN PATENT DOCUMENTS

| | | |
|---|---|---|
| DE | 19645259 A1 | 5/1998 |
| WO | 98/51124 | 11/1998 |
| WO | 99/03254 | 11/1999 |
| WO | 01/54458 A2 | 7/2001 |

*Primary Examiner*—Jean Gelin
(74) *Attorney, Agent, or Firm*—Pearne & Gordon LLP

(57) ABSTRACT

A fitting setup for hearing aids (1), wherein a cell phone (1) is the input device. The cell phone is used to communicate with a server so as to change the fitting setup for the hearing aid to an optimal setting. The cell phone may also be used to communicate personalized data to the network, as well as to update resident software programs on the hearing aid.

10 Claims, 3 Drawing Sheets

FITTING-SETUP FOR HEARING DEVICE

BACKGROUND OF THE INVENTION

The present invention relates to a fitting setup to match a hearing aid to an individual's needs, the fitting setup including a fitting unit with an input device operationally connected, in a wired or wireless manner, to an adjusting control input at the hearing aid.

Special, calculator-supported fitting means such as computers and, in particular, personal computers, have come to assume a predominant role since the introduction of programmable, digital hearing aids in fitting setups to match hearing aids to the individual's needs. Such setups are operationally connected, using known communication software, in wired or wireless manner, to an adjusting control input of the hearing aid. The adjusting control input is typically adjusted on the patient. In the course of the fitting or matching procedure, the signal transmission is changed at the hearing aid, between an acoustic/electric transducer at the input side and an electric/mechanical transducer at the output side, as a function of adjusting control signals at the adjusting control input. The changes are based on hearing tests performed with and without the hearing aid, and are also based on the individual's own perception of his hearing. The usually complex relationships between the simple statements regarding his hearing made by the individual and the adjustment of parameters at the hearing-aid signal transmission system are typically generated by a program at the fitting setup. Accordingly, optimal fitting an individual's digital hearing aid practically mandates visiting a specialist equipped with such a programmed fitting setup and who is familiar with the complex operation and functions of such setups.

Such a procedure is practically inevitable as regards modern hearing aids. Unfortunately, worldwide this excludes large populations from access to such hearing-aid technology on account of the frequent lack of infrastructure for such fittings, namely a setup, the relevant operational environment, and trained specialists. Accordingly, the fitting of hearing aids using trimmers or screwdrivers is widely preferred.

However, if the particular individual's hearing aid fitting is to be restricted to the just above-mentioned procedure, then the spectrum of applicable hearing aids, in particular modern digital hearing aids, shall be narrow. Even though the hardware of such hearing aids includes a plurality of fitting trimmers, and even though they are clearly identified, this hearing aid design entails complexity. Also, on account of mechanically moving parts, these hearing aids tend to require more frequent repairs, while the interacting adjustment of parameters is difficult to implement to attain optimal hearing enhancement.

SUMMARY OF THE INVENTION

The present invention is directed toward a device for overcoming the aforementioned problems in the art and to make more widely available modern hearing aids.

For that purpose, the invention proposes a fitting setup of the initially cited kind where the input device is a cell phone. The invention is based on the insight that, contrary to the case of personal computers and other fitting-specific setups, cell phones are widespread globally and they are increasingly handled in daily life. Because of the popularity of cell phones and the routine manner of their operation and menu control, the problem cited above is solved by the invention in that, as called for, the fitting of hearing aids can be carried out by the individual per se, especially and as further discussed below, if there is appropriate online support for the cell phone.

In a preferred embodiment of the fitting setup of the invention, the operational connection of cell phone and hearing aid is implemented by a converter. This connection between the cell phone and the converter is implemented by a high frequency link intrinsic to the cell phone and/or by means of an infrared link and/or an acoustic link. The communication link is implemented in a wired and/or wireless manner between the converter and the hearing aid.

A wireless communication link between the converter and the hearing aid may be implemented acoustically or, as called for, by means of a high-frequency link appropriate for the hearing aid or by means of an infrared link. An acoustic communications link, however, may also be set up directly between the cell phone and the hearing aid without any intermediate converter. The converter is preferably designed as an autonomous unit or is integrated into the cell phone.

In a preferred embodiment, the cell phone of the invention is designed to communicate with a communication network, such as the Internet and/or an Intranet. As a result it is possible to fully exploit the full potential of such networks, including e-trade (electronic ordering and purchasing), regarding hearing-aid fitting and software configuration of the hearing aid per se, including any updates.

Because the fitting setup of the invention also includes a server and because the cell phone is designed to communication with this server, and because at least one of the following kinds of data are transmitted between said server and cell phone,

- fitting program
- hearing-aid software,
- updates for fitting programs and/or hearing-aid software, the procedure of the invention allows using, from the cell phone, fitting programs which need not be memory-resident and which shall be the latest of their version(s) and/or implementing the program configuration at the hearing aid as well as economically updating said programs. Whereas, in the first instance, that is downloading fitting programs from a server, these programs, possibly only during the fitting procedure, are stored in the cell phone and from latter may be used for the hearing-aid fitting procedure. In the second above-mentioned case, namely when downloading hearing-aid programs, the cell phone now shall only be used as a manual control unit and as a transit station, where called for, together with the converter, in order to transmit hearing-aid software delivered by the server to this hearing aid.

In a further embodiment of the invention, where the setup of the invention includes a server and the cell phone is designed to communicate with the server, the following data are transferred between them:

- personalized hearing-aid data from the cell phone to the server and/or
- personalized hearing-aid adjusting data from the server to the cell phone.

In this way, it is possible to store the instantaneous adjustments of the personalized hearing aid at the server and to store, in a practical manner, the updates and adjustment history of the hearing aid. Therefore, the individual's perceived hearing data can be transmitted from the individual through the cell phone to the server, for the purpose of optimizing the perceived hearing and, while taking into account the above perceived data and the history of individual and hearing aid and the instantaneous adjustments of the hearing aid, it is be possible to use the cell phone to directly change and adjust the hearing aid. In this procedure the optimized adjustment by an expert for the personalized hearing aid is shifted to the server which illustratively is operated by a hearing-aid enterprise or a hearing-aid professional association.

As already mentioned above, additional services provided during such a procedure can be financially paid for in a manner conventional in e-trade, such as by subscription or by specific ordering and payment.

As regards the present invention, therefore, the cell phone used in the fitting setup of the invention, even in its minimalist design and detached from its intrinsic telephone function can be used, so-to-speak, as an electronic screwdriver. Preferably, using the converter, a communications link is set up with the hearing aid(s) and the cell phone is switched by manual input and/or by voice input is menu-selected into a hearing-aid fitting mode. Thereupon the transmission parameters at the hearing aid are adjusted by an individual wearing the hearing aid or by a specialist, by operating on the input. Whether a specialist is needed or the individual can operate on his own depends largely on whether the matching or fitting program at the hearing aid can convert inputs of simple hearing perceptions into more complex parameter-adjustment relationships for the hearing aid.

In the event the hearing-aid fitting should be carried out by the individual himself, the invention proposes that adjustments which already were carried out can be subjected to reset (restoration to default settings) merely by manual input at the cell phone. These default settings may be set by prior action of trained specialists or may be set at the factory. As already mentioned above, appropriate programming of the hearing aid easily allows, by means of simple inputs at the hearing aid, converting the individual's defined hearing perception into more complex multi-parameter hearing-aid fittings and to transmit them to the hearing aid.

A further embodiment of the fitting setup of the invention also allows accessing databases and computing power in enterprise-specific (Intranet), subsidiary-specific (Intranet) or global (Internet) manner.

When such accessibility is used by the cell phone of the invention, then same shall be ever more different from an electronic screwdriver. Accordingly, the cell phone ultimately becomes an interface between different transmission protocols and an input keypad to initiate a server/hearing-aid link.

Be it emphasized that the expression "cell phone of the invention" in the present specification and claims also includes devices which, besides their cell-phone function, comprise further functions in the manner increasingly familiar. Such devices may be, for instance, personal digital assistants (PDAs).

Accordingly, a server constituting a portion of the fitting setup of the invention may not only make available information specific to the hearing aid by means of the cell phone, in which case the personalized hearing-aid fitting procedures are carried out as before by operating the cell phone, but also allows storing identification values at this server which contain, besides the type of hearing aid, also the personally matched parameters, namely, as already mentioned, the "adjustment history" of the hearing aid(s). Thereupon, after a call and identification to this server by means of the cell phone and transmission of any remnant perceived hearing deficiencies, and based on the instantaneous parameter constellation stored at the server and, where called, for on the pre-history of recorded perceived hearing deficiencies and parameter changes already performed, further optimization of the hear-aid setting can be transmitted by the cell phone to the hearing aid. It is henceforth possible to retrieve both hearing-aid specific data to control the cell-phone computer unit or to shift the computing power from the cell phone to the server and thereby, as already mentioned, to make use of the cell phone merely as the input and transit station between the hearing aid and the server. It is clear that in this case the hearing-aid adjustment becomes highly independent of the adjusting person and will merely depend henceforth on the perceived hearing of the hearing-aid bearing individual.

BRIEF DESCRIPTION OF THE DRAWING

These and further features of the invention will be apparent with reference to the following description and drawings, wherein.

DETAILED DESCRIPTION OF THE PREFERRED EMBODIMENT

Figure 1:
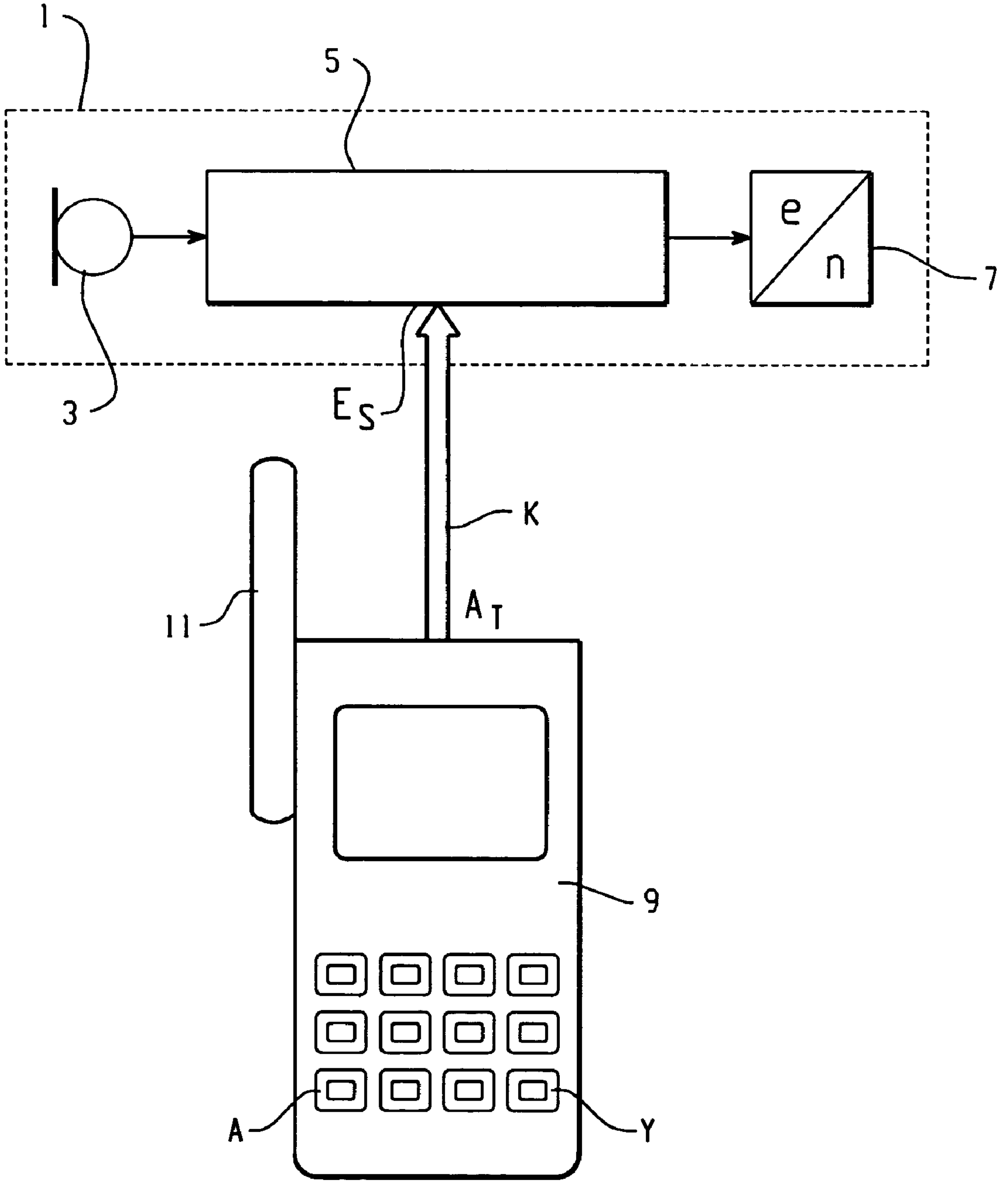
FIG. 1 is a simplified block diagram of a first embodiment of a fitting setup of the invention.

FIG. 1 schematically shows a hearing aid 1 comprising an acoustic/electric transducer 3 at the input side, a digital signal-transfer path 5, and an electric/mechanical transducer 7 at the output side. The coarse fitting of the hearing aid initially can be carried out off-site, for instance in the lab, on the basis of diagnostic data. The fine fitting always shall be on-site, that is carried out on the individual.

The hearing aid comprises an input $I_S$. Signals at this input $I_S$ change transfer parameters at the digital transfer path 5. The input $I_S$ is directly or indirectly connected by a link K to an output $O_T$ of a cell phone 9. The link K can be implemented in a number of ways. For instance, the link K can be in the form of the antenna 11 of the phone 9, or by means of a converter or interface converting high-frequency signals into control signals for the hearing aid. The link K can also be provided using infrared and corresponding interfaces, in wired manner, whether electrically or optically, or acoustically. In each link case, the appropriate interfaces must be provided at the hearing aid or the cell phone.

Figure 2:
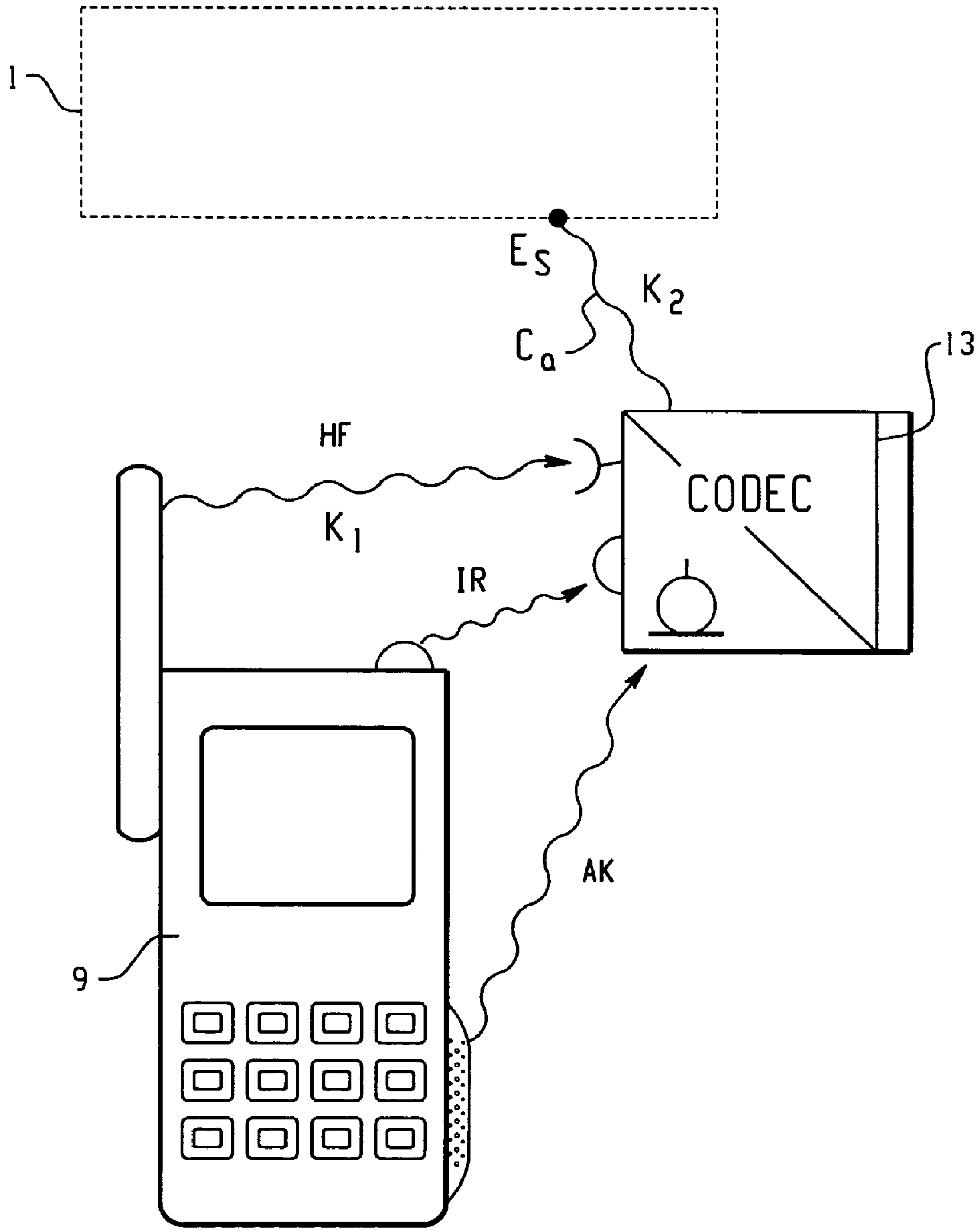
FIG. 2 is a simplified signal-flow/functional block-diagram of a preferred embodiment of the setup of FIG. 1, and FIG. 3 schematically shows the design of a fitting setup of the invention with server support.

In a preferred embodiment of the invention shown in FIG. 2, the communications link K between the cell phone 9 and the hearing aid 1 is in the form of a CODEC 13 converter. The converter is preferably a separate unit fed from an independent electric power source and, in practice, operating as a relay. The link $K_1$ between the cell phone 9 and the converter 13 is implemented by a high-frequency link HF of the cell phone and/or by an infrared link IR and/or by an acoustic coupling AK. The communications link $K_2$ between the converter 13 and the hearing aid 1 is preferably implemented, electrically or optically, in a wired manner, as denoted by Ca. Where called for, the link $K_2$ may be wireless (not shown) and implemented by means of a high-frequency link of a kind fitting the hearing aid 1, or using an IR link or being acoustic. As shown in FIG. 2, the converter 13 may be a separate unit or it may be integrated into the cell phone 9 or into the hearing aid 1.

For hearing aid fitting, the cell phone 9 is menu-controlled manually and/or by voice input, for instance by operating a special keypad to be switched into the fitting mode. Thereupon, by means of further inputs, signals controlling parameter changes are fed through the communications link K or $K_1$, $K_2$ to the hearing aid control input $I_s$ and the transfer function of the hearing aid is then commensurately changed.

The configuration of the fitting setup of the invention shown in FIGS. 1 and 2 easily allows implementing simple hearing-aid fittings, such as lowering the high-frequency gain, raising the bass transmission etc. These fittings may be accomplished by means of input manipulation or voice input and their direct conversion, through the communications link K or $K_1$, $K_2$, as regards a single adjustment parameter. Most of the time, however, a plurality of parameters must be changed at the digital transfer path 5 of the hearing aid 1, in a controlled manner, while they are interacting, and this on the basis of simple perceptions of hearing, by the individual bearing the hearing aid 1, such as "too loud", too shrill . . . " etc.

In such a case, either the specialist, that is the hearing-aid acoustician, relays the verbally communicated perceptions of hearing into a plurality of transfer parameters to be changed and works on the inputs of the cell phone 9 of the invention, or else the fitting program, downloaded into the cell phone 9 by means of simple inputs into the cell phone 9, automatically converts the inputs into the required number of parameter changes so that any complex relationships be taken into account.

In principle the manual inputs through a keypad, for instance, may be replaced by voice inputs with an appropriately designed cell phone 9.

When entering hearing aid type specific programs into the processor-controlled cell phone 9, then by means of manual and/or voice inputs, adjusting signals are transmitted in a menu-selected manner through the communication link K or $K_1$, $K_2$ to the hearing aid 1. These programs may be designed so that, as a function of simple inputs corresponding to the above-mentioned perceptions of hearing, they shall drive more or less complex adjustment procedures at the hearing aid. The hearing-aid specific programs are downloaded into the cell phone 9, whether by inserting a SIM card or by means of other external inputs, as will be discussed further hereinafter.

Figure 3:
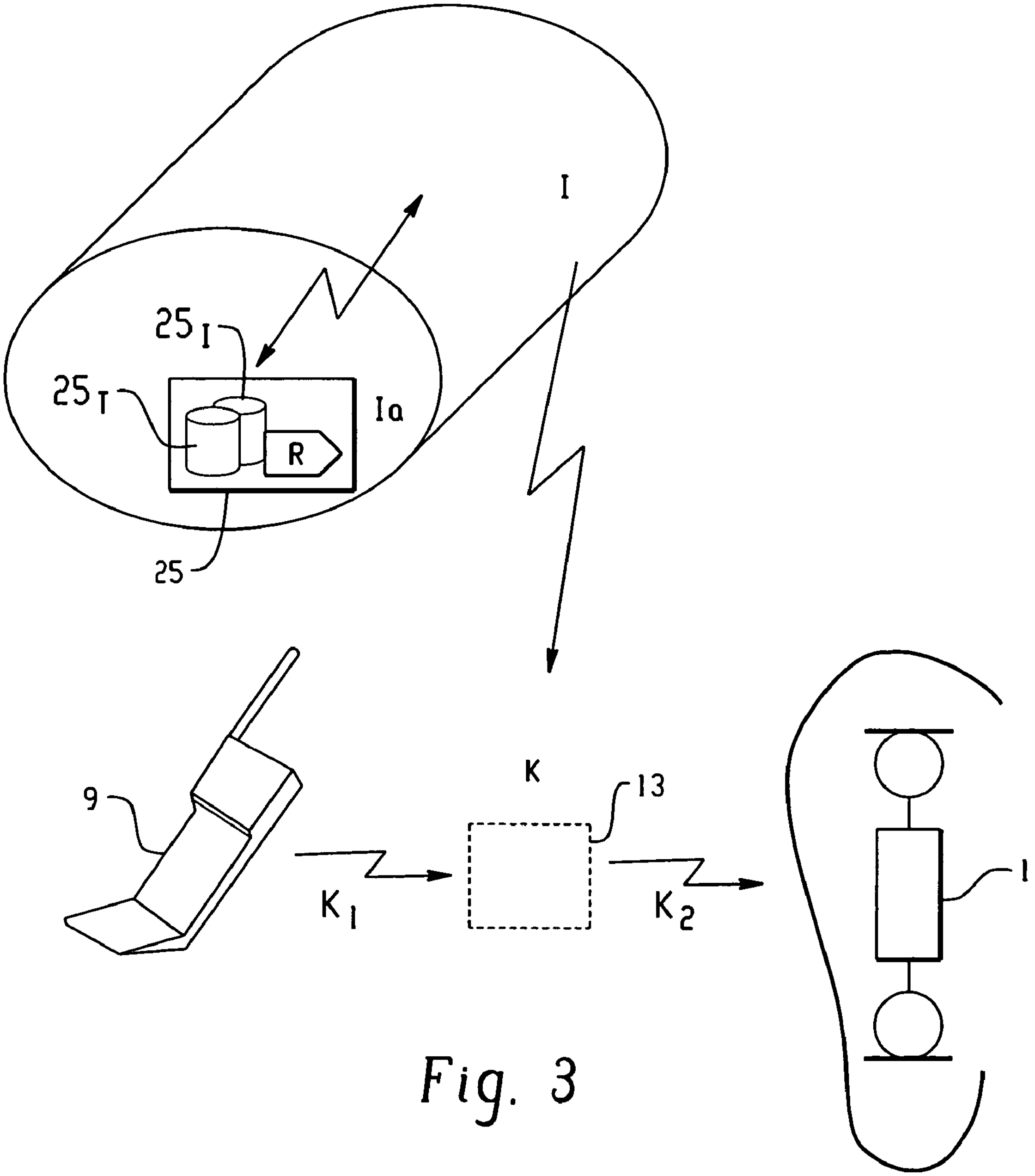

Based on the discussions relating to FIGS. 1 and 2, the intrinsic communication properties of the cell phone 9 are further combined into the fitting setup of the invention shown in FIG. 3. The cell phone of the invention communicates, for instance, through the Internet I and/or an Intranet Ia covering enterprises and customers with a server 25. The particular fitting modes and algorithms, i.e. fitting programs $25_T$ are stored in this server 25 which illustratively can be operated jointly or specifically by hearing-aid manufacturers or third-party suppliers. When the cell phone 9 in its fitting menu calls the server 25, the required fitting programs are transmitted from the server 25 to the cell phone 9. As a result, the required parameter changes can be transmitted by the cell phone 9 through the communications link K or $K_1$, $K_2$ to the hearing aid 1 worn by the user. Where called for only within a given time window, that is only for the time of fitting, the fitting program is downloaded from the network I, Ia into the cell phone 9.

In another mode resorting to the server 25, the cell phone 9 transmits the instantaneous hearing-aid settings and the required changes to the server 25. Not only hearing-aid type-specific data, in particular fitting programs, are stored, as shown schematically, in the server in the memory unit $25_T$, but also personalized hearing-aid specific data as schematically indicated in the memory unit $25_I$. Such personalized hearing-aid specific data may be, for instance, individual perceptions of hearing and entailed parameter changes and also, if called for, the history of settings of each personalized hearing aid. The individual, by identifying himself through the cell phone 9 and by his input of further perceptions of hearing or requests for correction, can each time initiate a new optimizing cycle. A new change in parameters is thus determined using the server-resident computing power R on the basis of the more or less substantial, stored setting history of the personalized hearing aid 1 and of the newly communicated perceptions of hearing or requests for correction, thereby optimally matching the hearing aid to the individual's desires. Preferably, and without further intervention by the individual, the parameter changes are implemented, through the cell phone 9 and the communications links K or $K_1$, $K_2$, directly at the hearing aid 1 at the individual's ears.

Especially as regards using an external database, where called for comprising computing power, it is understood, as explained in relation to FIG. 3, improved fitting programs can be transmitted any time to the cell phone 9 where this phone shall be used offline in its fitting menu. In the extreme case, signal-processing programs or software at the hearing aid can be downloaded from the server 25 for the initial configuration and thereafter be serviced or updated by the server 25.

Preferably the known commercial resources of e-trade may be used for this above-mentioned servicing.

Moreover, optimization of fitting, program updates etc., may easily run in the background during normal cell-phone operation, in particular also when there is a direct, wireless link between the cell phone and the hearing aid.

It is also understood that the fitting setup of the invention, which above has been discussed in the form of fitting a single hearing aid, is equally well suited to fitting binaural hearing aids.

What is claimed:

1. A hearing aid system comprising:

a hearing aid for improving individual's hearing, having an acoustical/electrical input converter arrangement, an electrical/mechanical output converter arrangement to transmit signals to be heard to an individual carrying the hearing aid, and a signal processing unit to process electrical signals to be heard by said individual, the output of said processing unit being operationally connected to an input of said electrical/mechanical output converter arrangement, said processing unit having a communication input; and a cell phone remote from the hearing aid and having cell phone intrinsic communication properties and an output, said communication input of said processing unit being wirelessly directly connectable to said output of said cell phone to establish communication between said cell phone and said hearing aid.

2. The system of claim 1, wherein said communication input is a control input, signals input to said input controlling operation of said processing unit.

3. The system of claim 1, wherein said operational connection between said output of said cell phone and said input of said processing unit, comprises a converter with an input and with an output, said input of said converter being operationally connected by a first link with said output of said cell phone and said output of said converter, being operationally connected by a second link with said communication input of said processing unit.

4. The system of claim 3, wherein said first link is one of a high frequency link, an infrared link and of an acoustic link.

5. The system of claim 3, wherein said second link is one of a wired and of a wireless link.

6. The system of claim 3, wherein said converter is integrated into said cell phone or into said hearing aid.

7. The system of claim 1, wherein there is provided a remote control unit for said hearing aid and said remote control unit is said cell phone.

8. The system of claim 1, further comprising at least one server and wherein said cell phone is designed to communicate with said server via a cell phone antenna, and at least one of the following kinds of data:

fitting program data, processing software data for said processing unit and update data for at least one of said fitting program and said processing software.

9. The system of claim 1, further comprising at least one server wherein said cell phone is designed to communicate with said server, the following data being transmitted between said cell phone and said server:

personalised data of said hearing aid of an individual.

10. The system of claim 1, wherein said cell phone is adapted to communicate with a communications network and communicates data from said network to said hearing device.

* * * * *

UNITED STATES PATENT AND TRADEMARK OFFICE

CERTIFICATE OF CORRECTION

PATENT NO. : 6,978,155 B2

DATED : December 20, 2005

INVENTOR(S) : Christian Berg

It is certified that error appears in the above-identified patent and that said Letters Patent is hereby corrected as shown below:

Column 2,
Line 29, delete “communication” and insert -- communicate --.

Signed and Sealed this

Fourth Day of April, 2006

JON W. DUDAS
*Director of the United States Patent and Trademark Office*